Aug. 4, 1959     H. A. WINTERMUTE     2,898,532
ELECTROMAGNETIC RAPPING DEVICE
Filed Feb. 16, 1955     2 Sheets-Sheet 1
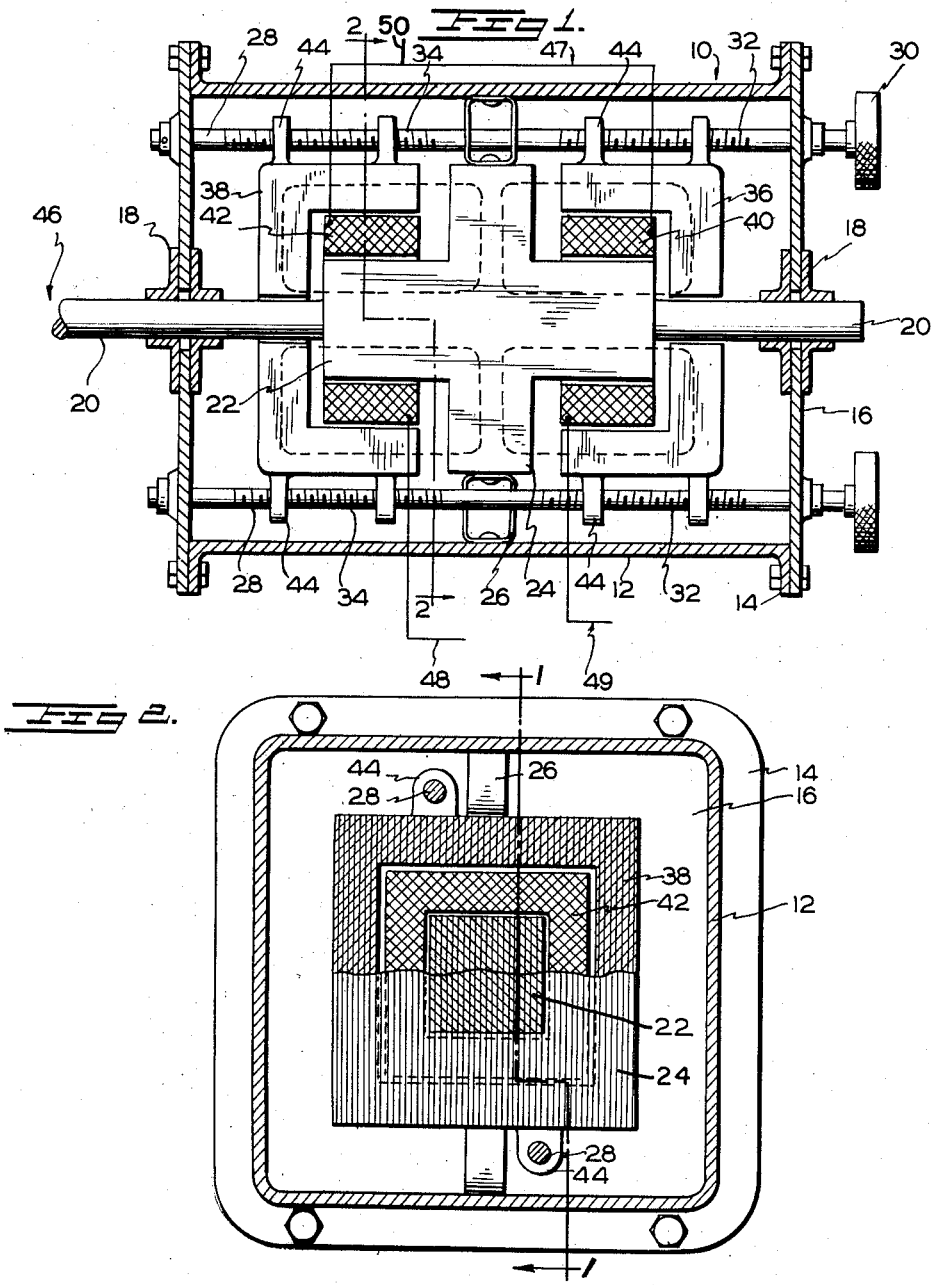
INVENTOR
HARRY A. WINTERMUTE
BY Harold T. Stowell
ATTORNEY

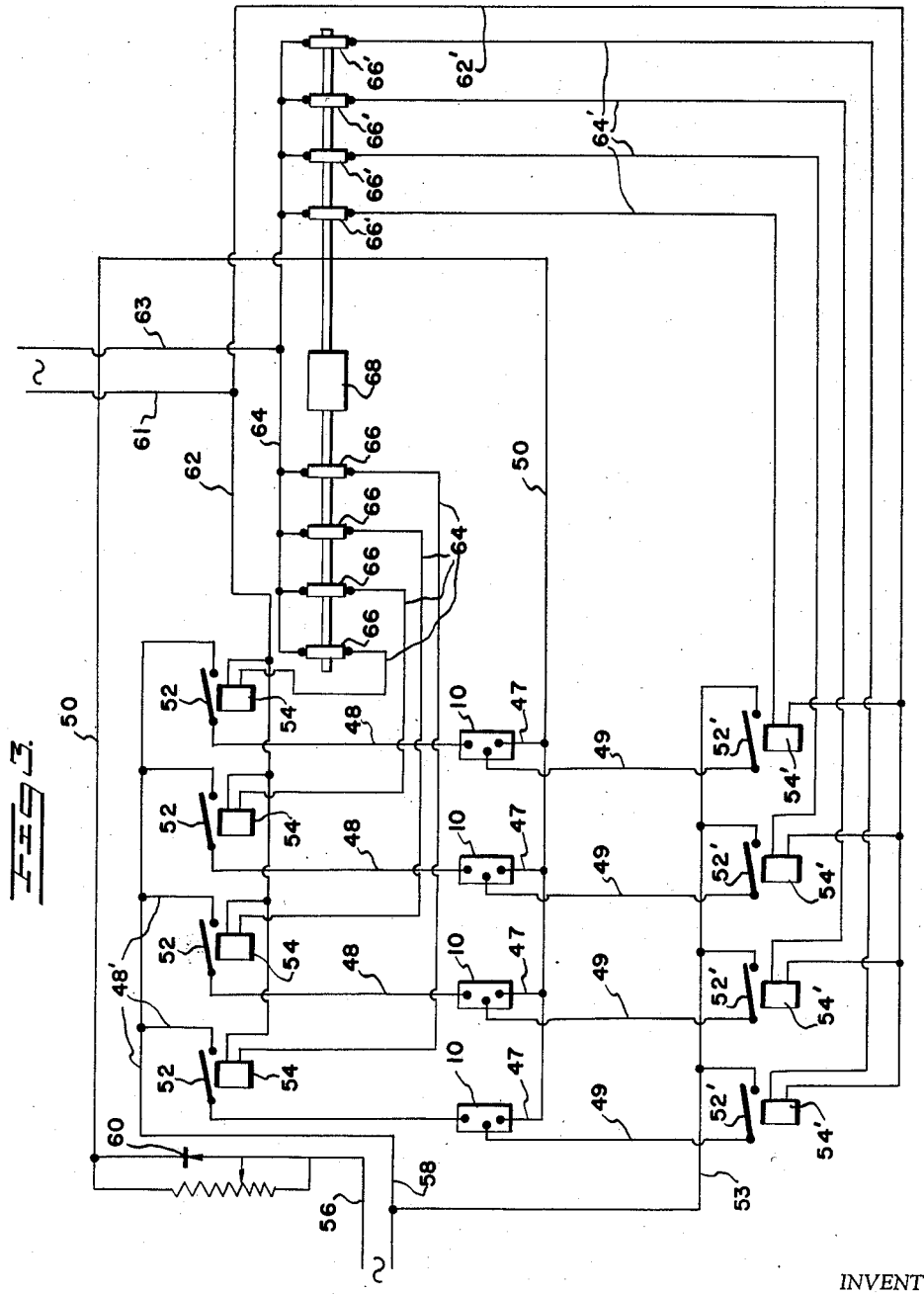

United States Patent Office 2,898,532
Patented Aug. 4, 1959

2,898,532

ELECTROMAGNETIC RAPPING DEVICE

Harry A. Wintermute, Plainfield, N.J., assignor to Research Corporation, New York, N.Y., a corporation of New York Application February 16, 1955, Serial No. 488,678

3 Claims. (Cl. 318—125)

This invention relates to vibrators and more particularly and specifically to vibratory motors of the electromagnetic type in which the armature reciprocates or vibrates at controlled frequencies and to automatic control systems for a plurality or bank of such vibratory motors.

The invention disclosed hereinafter is a continuation-in-part of my co-pending application for United States Letters Patent, Serial No. 393,777, filed November 23, 1953, now abandoned.

The vibratory motor and control system constituting the present invention is particularly adaptable to, though not limited to, use as a rapper in skimmer type gas separators in which it is desirable to place the gas deflecting vanes alternately under positive compression and tension forces at controlled high frequencies.

Heretofore various pneumatic, cam, piezoelectric and electromagnetic rapper constructions have been employed in gas separators, and the present invention constitutes a substantial improvement over prior constructions and apparatus which results in a more efficient and superior vibrator for gas separators.

It is therefor a principal object of the present invention to provide a vibratory motor and control apparatus therefor which result in an increased efficiency and effectiveness of rapping operation.

Another object of the instant invention lies in the provision of a vibratory motor which is readily capable of support externally of a gas separator for easy access, and a motor which provides for a positive rapping connection with the inner components of the separator which are to be vibrated.

Still another object of this invention is the provision of a vibratory motor in which the amplitude of vibration is selectively adjusted and controlled by a simple manual operation.

A further object of this invention is the provision of a control system for one or more of the vibratory motors constructed in accordance with the present invention whereby operation of each of the motors is automatically controlled and which permits selective control of the motor vibration frequencies.

A further object and advantage of this invention is the provision of a vibratory motor having the foregoing objects and advantages which is of relatively simple and inexpensive design and construction yet a motor which is efficient and durable under continuous use.

Still further objects and advantages of the present invention will become readily apparent to those skilled in the art when the following general statement and description are read in the light of the accompanying drawings.

The nature of the present invention may be stated in general terms as relating to a vibratory motor and control circuit therefor wherein the motor includes a frame, an armature reciprocatively supported in said frame, a plurality of magnetic cores and associated coil windings adjustably supported in spaced relationship within the frame about said armature, resilient means normally urging said armature to a balanced position relative to said spaced cores and windings, a source of electric current connected to said core windings, and means in said power connection for alternately exciting said spaced coils with half-wave energization.

Referring now to the accompanying drawings in which like numerals designate similar parts throughout the several views:

Fig. 1 is a side sectional view taken on line 1—1, Fig. 2 of the vibratory motor constituting a part of the present invention.

Fig. 2 is a section taken on line 2—2, Fig. 1.

Fig. 3 is a diagrammatic view of an electric control system for use in energizing a plurality of vibrator units of the type constituting a part of the present invention.

Referring now in detail to the accompanying drawings, the vibratory motor constituting a basic part of the present invention generally consists of a substantially rectangular frame or casing 10 having elongated side enclosing members 12 flanged at each end as at 14, the end flanges 14 supporting the end enclosing members 16 of the frame. Each of the end members 16 of the frame is provided centrally therethrough with a flexible gasket 18, each end gasket receiving therethrough a shaft 20 which extends inwardly for a spaced distance of the frame.

Located within the frame and supported intermediate the opposed ends of the shafts 20 is an armature 22 which is generally of cross-shaped configuration in side elevation. The laterally projecting arms 24 of the cross-shaped armature are resiliently connected centrally of the side members 12 of the frame by suitable flat loop springs 26 thereby resiliently urging the armature centrally within the frame.

A pair of reversing screw shafts 28 is rotatably journaled longitudinally of the frame with each screw shaft lying adjacent the spaced side members 12 and each shaft having one end projecting through one end member of the frame where they each carry a knurled control knob 30. Each of the screw shafts 28 is divided substantially centrally longitudinally of its length into two screw threaded sections 32 and 34, the threads of each section being pitched from the longitudinal center of the shaft toward the adjacent end portions of the frame. Associated with the armature within the frame 10 are two substantially cup-like laminated magnetic cores 36 and 38 of general U-shaped cross-section, each of which is provided with an associated electrical coil 40 and 42 respectively. Each of the cores 36 and 38 are positioned substantially telescopically over each of the longitudinally extending arms of the cross-shaped armature and each core carries on its outer face disposed toward the side members 12 of the frame 10 a pair of guide lugs 44 which are threadedly engaged on the adjacent threaded section on that portion of the reversing shaft 28 immediately adjacent thereto.

By the foregoing construction simultaneous rotation of each of the reversing shafts 28 will move the two core assemblies 36 and 38 either toward or away from each other and in telescopic relationship with the armature 24, dependent upon the direction of rotation of the shafts. This construction provides for manual control of the core positioning relative to one another and to the armature for control of the amplitude of vibration of the armature upon energization of the coils 40 and 42 in manners to be hereinafter described.

As is seen in Figs. 1 and 2 the lateral arm portions 24 of the cross-shaped armature 22, which are located longitudinally centrally of the frame, extend outwardly intermediate the opposed ends of the coils 40 and 42 to establish (dotted lines, Fig. 1) magnetic flux paths throughout the entire circumference of the coils.

In addition, extension of one of the shafts 20, as at 46, provides means for positive connection with a rapper member as shown in my said co-pending application, Serial No. 393,777 to provide positive tensional and compressional rapping vibration of the rapper member by the motor.

Operation of the vibratory motor heretofore described is obtained by the alternate, timed excitation of the magnetic core coils 40 and 42 with half-wave energization through appropriate control apparatus connecting said coils with a power source. Such alternate half-wave energization of the coils 40 and 42 will produce alternate compression and tension vibration phases or oscillations of the armature between the cores and the windings, aided by the resilient stability of springs 26, causing positive tension and compression vibrations of the shafts 20 longitudinally of the frame in their flexible gasket supports in the end members thereof.

The vibrator motor is powered by half-wave energization through the common power lead 47 and reversing power leads 48 and 49 of coil windings 42 and 40, respectively. These power leads may be electrically connected to a source of power as shown in Figure 3.

In Fig. 3 of the drawings a plurality of vibrators 10, of the type shown in Figs. 1 and 2 of the application drawings, have common lead 47 of coils 40 and 42 connected to a common conductor 50. The conductor 50 is connected to line terminal 56, through a rectifier 60 of the conventional dry plate or electronic type. The leads 48 of vibrators 10 are connected to the other line terminal 58 through conductors 48' and switches 52. Each switch 52 is provided with solenoid type actuator 54.

The solenoids 54 are actuated by power entering through electrical conductors 62 and 64 connected to a source of alternating current through conductors 61 and 63 respectively.

Interposed between the solenoids 54 and the conductor 64 are a plurality of rotary timer switches 66 which are driven in unison by a timer motor 68.

The leads 49 of tension coils 40 are also connected to line terminal 58 through a substantially duplicate circuit as follows. Line terminal 58 is connected through conductor 53 and switches 52' to the leads 49 of coils 40. The switches 52' are provided with solenoid actuators 54'. The solenoids 54' are actuated by power entering through power leads 61 and 63. Power lead 61 is connected to the coils through conductor 62' while power lead 63 is connected to the other lead of the solenoids 54 through rotary timer switches 66' which are driven by the common timer motor 68.

In operation of the motor of the invention timer switches 66 energize the solenoids 54 during one half the cycle of the alternating current supplied to terminals 56 and 58 or some multiple thereof so that a half wave current is fed through the coil windings 42 only for this interval of half waves. Following this interval either immediately or some interval thereafter timer switches 66' energize the solenoids 54' during a similar one half the cycle of the alternating current applied to the terminals 56 and 58 or some multiple thereof so that a half wave current is then fed to the coil windings 40. The alternate energization of the coils 40 and 42 through the common lead 50 and the timing switches 66 and 66' cause the shafts 20 of the motors to be reciprocated, the reciprocations being adjustable as to frequency through the timer motor 68 and as to amplitude through the reversing screws 28. The interval of energization of the rapper motors may be as long as 20 seconds whereby each coil 40 and 42 may receive as many as 1200 half waves impulses during each rapping cycle when a 60 cycle alternating current is applied to the terminals 56 and 58.

As have been previously stated, the amplitude of the rapping vibrations produced by the motor armature are controlled by the adjusted positioning of the core apparatus through the reversing screw shafts 28, and the period of the rapping vibration produced by the motor is controlled through the timer motor 68 and the correlated switching control systems associated with the coils 40 and 42.

Accordingly, it is seen that an efficient electrical control system is provided for controlling one or more vibratory motors of the type herein disclosed for the effective and efficient rapping of gas separator components of rather the mechanical or electrostatic type whereby the element being rapped is subjected to compressional and tensional forces.

From the foregoing description, it is seen that a new and improved vibratory motor has been provided which is capable of quick and easy control for the amplitude of motor vibration and which is of an efficient and inexpensive construction.

It is also seen that a simple and effective electrical control system for operation and frequency control of the vibrator motors described is provided which makes possible the control of one or more of such motors in association with gas separating apparatus.

Thus having described and explained the novel features of construction of my invention, and the new and useful results obtained thereby, I claim:

1. A vibratory motor including a frame, field members located in spaced apart relationship within said frame, an armature reciprocally mounted in said frame intermediate said field members, resilient means interconnecting said armature and said frame normally biasing said armature to a balanced position intermediate said field members, means associated with said frame and having operable connection with said field members for simultaneously moving said field members toward or away from said armature, conductor means connecting said field members to a source of electric current, and control means associated with said current source for alternately supplying said field members with half-wave energization.

2. A vibratory motor including a frame having side and end enclosing members, two cup-like field members located in spaced open end to open end opposition in said frame, an armature reciprocally mounted in said frame axially intermediate the opposed open ends of said field members, resilient means interconnecting said armature and said frame normally biasing said armature to a balanced position relative to the opposed open ends of said field members, elongated screw means rotatably journaled in said frame and having reversed threaded engagement with said field members providing for simultaneous adjustment of said field members axially toward and away from one another and said armature, rigid shaft means connected with said armature and extending outwardly of said frame axially of the direction of reciprocal movement of said armature, conductor means connecting said field members to a source of electric current, and timed switching means associated with said current source and alternately feeding said field members with half-wave energization.

3. A vibratory motor including a frame, a pair of opposed cup-shaped field members positioned in spaced open end to open end relationship in said frame, an armature reciprocably mounted in said frame intermediate said cup-shaped field members, resilient means interconnecting said armature and said frame to normally bias said armature to a balanced position intermediate said cup-shaped field members, means interconnecting said cup-shaped field members, said interconnecting means including means for simultaneously moving said cup-shaped members toward and away from each other to increase and decrease their spaced relationship, conductor means connecting said cup-shaped field members to a source of electric current, and control means in said conductor means for alternately supplying said source of current to said field members to bring about reciprocation of said armature.

References Cited in the file of this patent

UNITED STATES PATENTS

| | | |
|---|---|---|
| 520,810 | Thomson | June 5, 1894 |
| 1,583,582 | Dominguez | May 4, 1926 |
| 1,723,830 | Weyandt | Aug. 6, 1929 |
| 2,177,795 | Von Delden | Oct. 31, 1939 |
| 2,444,134 | Hittson | June 29, 1948 |
| 2,568,757 | Mesh | Sept. 25, 1951 |
| 2,784,332 | Kober | Mar. 5, 1957 |

FOREIGN PATENTS

| | | |
|---|---|---|
| 357,558 | France | Nov. 15, 1905 |